(12) United States Patent
Wortberg et al.

(10) Patent No.: US 10,391,886 B2
(45) Date of Patent: Aug. 27, 2019

(54) POWER SUPPLY SYSTEM FOR SAFETY-RELEVANT SYSTEMS IN A MOTOR VEHICLE

(71) Applicant: Lisa Draexlmaier GmbH, Vilsbiburg (DE)

(72) Inventors: Michael Wortberg, Dorfen (DE); Anton Bachmeier, Kumhausen (DE); Anton Ederer, Reisbach (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 89 days.

(21) Appl. No.: 15/879,227

(22) Filed: Jan. 24, 2018

(65) Prior Publication Data
US 2018/0208064 A1 Jul. 26, 2018

(30) Foreign Application Priority Data
Jan. 25, 2017 (DE) .................... 10 2017 101 369

(51) Int. Cl.
| | |
|---|---|
| *B60L 50/50* | (2019.01) |
| *B60L 1/12* | (2006.01) |
| *B60L 1/00* | (2006.01) |
| *B60L 3/00* | (2019.01) |
| *B60L 50/15* | (2019.01) |

(52) U.S. Cl.
CPC ............ *B60L 50/50* (2019.02); *B60L 1/00* (2013.01); *B60L 1/12* (2013.01); *B60L 3/0046* (2013.01); *B60L 3/0069* (2013.01); *B60L 3/0092* (2013.01); *B60L 50/15* (2019.02); *Y02T 10/7005* (2013.01)

(58) Field of Classification Search
CPC .. B60L 50/50; B60L 50/15; B60L 1/00; B60L 1/12; B60L 3/00; B60L 3/0046; B60L 3/0069; B60L 3/0092; Y02T 10/7005
USPC ........................................................ 307/10.1
See application file for complete search history.

(56) References Cited

U.S. PATENT DOCUMENTS

| | | | |
|---|---|---|---|
| 2004/0227402 A1 | 11/2004 | Fehr et al. | |
| 2006/0097577 A1* | 5/2006 | Kato | .............. F02N 11/0866 307/10.1 |

FOREIGN PATENT DOCUMENTS

| | | |
|---|---|---|
| DE | 19855245 | 6/1999 |
| DE | 102005005236 | 8/2006 |
| DE | 102011083582 | 3/2013 |
| DE | 102012207624 | 11/2013 |

(Continued)

*Primary Examiner* — Carlos Amaya
(74) *Attorney, Agent, or Firm* — Burris Law, PLLC

(57) ABSTRACT

A power supply system for safety-relevant systems in a motor vehicle is provided that includes a first supply path and a second supply path. The first supply path includes a first connection point for a first voltage source, one or more first supply points for a safety-relevant load, and a first fuse between the first connection point and the first supply point. The second supply path is electrically coupled to the first supply path and includes a second connection point for a second voltage source, one or more second supply points for the safety-relevant load, and an electronic second fuse coupled between the second connection point and the second supply point. The safety-relevant load is capable of being electrically coupled to both the first and second supply point. Disconnecting elements are provided to isolate a fault in conformity with ASIL B.

20 Claims, 3 Drawing Sheets

(56) References Cited

FOREIGN PATENT DOCUMENTS

| DE | 102013017162 | 3/2015 |
|----|--------------|--------|
| DE | 102014203030 | 8/2015 |

* cited by examiner

POWER SUPPLY SYSTEM FOR SAFETY-RELEVANT SYSTEMS IN A MOTOR VEHICLE

CROSS-REFERENCE TO RELATED APPLICATIONS

This application claims priority to and the benefit of German Patent Application No. DE 10 2017 101 369.5 filed on Jan. 25, 2017. The disclosure of the above application is incorporated herein by reference.

FIELD

The present disclosure relates to a power supply system for safety-relevant systems in a motor vehicle.

BACKGROUND

The statements in this section merely provide background information related to the present disclosure and may not constitute prior art.

Modern vehicles nowadays are equipped with over 100 control devices, 1000 plug connections and up to 4 km of cable in the on-board electrical system. For this reason, the on-board electrical system and its components pose a risk as far as the likelihood of failure is concerned. In addition, new functions are being introduced into vehicles, posing an increased hazard to the occupants and to the environment in the event of a failure. Thus, safety-relevant vehicle functions in particular must be viewed from the perspective of functional safety, i.e. the impact of a failure on the vehicle function is already taken into consideration during the concept and development phases. Autonomous driving systems are functions relevant to functional safety and must be given special attention in future safety concepts.

Partially autonomous functions such as automated steering in the parking function are already in existence in today's road traffic. These functions are designed as fail-safe functions. This means that after a fault (fail) has occurred, the "off" state (safe) is assumed and the driver is informed via visual/acoustic instruments. Therefore, consideration of the functional safety of such functions nowadays often ends at the connector of the control device, since an interruption or failure of the power supply leads directly to the safe "switched off" status. Thus, there is no need for a safety concept at the power supply level that connects various components together.

Automated driving systems on the other hand must be designed as "fail-operational" with a fault status transition to the safe "on" state. The failure of the power supply (supply line) or communications (bus line) for this function may result in a direct endangerment of passengers and people from the surroundings. This safe "on" or "switched-on" state must be maintained and executed in an appropriate safety mode for as long as it takes for the vehicle to be brought to a stop in a safe location or until the driver can take over control of the vehicle.

The vital functions of highly automated driving such as steering and braking are classified by vehicle manufacturers (OEMs) at the highest safety level (ASIL D) due to their possible damaging effects and the occupants' low fault controllability. In this connection, a classification is implemented taking the gravity of the fault into account as well as the endangerment of the user or of the environs (severity), the likelihood of occurrence (exposure), i.e. the interaction of malfunction and operational condition, and control over the fault (controllability). This is then referred to as the ASIL classification, which distinguishes between four levels of ASIL (automotive safety integrity level) A to D, with ASIL D being the highest safety level at a required failure probability of less than $10^{-8}$/hour.

Against the background of the damage and risk analysis assessment and ASIL classification according to ASIL D, OEMs are currently developing safety architectures for a safe power supply in the on-board electrical system. The approaches taken can be summarized as follows:

1. redundant electric power supply for aggregates; and/or
2. providing a large number of sensors with functional overlap, so that individual sensors can fail but their function is taken over by the other sensors.

SUMMARY

The present disclosure provides an on-board electrical system architecture using the simplest possible constructional means, that makes a power supply available for safety-relevant loads at low cost while meeting the highest safety level (ASIL D).

The present disclosure provides a power supply system for safety-relevant systems in a motor vehicle that includes two supply paths, each being coupled or capable of being coupled via a supply point to a safety-relevant load. To this end the first supply path has a first connection point for a first voltage source or current supply, and a first supply point for the safety-relevant load. The second supply path has a second connection point for a second voltage source or current supply, and a second supply point for the safety-relevant load. The safety-relevant load is an electrical consumer or a safety-relevant system with a safety rating according to ASIL D. The first connection point and the first supply point are electrically coupled via a first fuse. The second connection point and the second supply point are electrically coupled via a second, electronic fuse. The two supply paths are electrically coupled. Here two disconnecting elements are arranged between the first supply point and the second supply path, and two disconnecting elements are likewise arranged between the second supply point and the first supply path. The disconnecting elements are each configured to isolate a fault. The disconnecting elements here are designed at least in conformity with ASIL B. A disconnecting element designed as an electronic circuit breaker is arranged between the two supply paths in such a manner that the two supply paths coupled through it can be isolated when the electronic circuit breaker is actuated.

Disconnecting can be understood to mean uncoupling. The second fuse assumes the task of a disconnecting element or functions as a disconnecting element between the second supply point and the first supply path. Thus, the second fuse is designed to uncouple the first supply path. In other words, the present disclosure uses an electronic safeguard (fuse) in the second supply path, which permits isolation from overcurrent with no disturbance. Thus, the diversity in the safeguarding is given. In addition, an electronic circuit breaker is used between the supply paths.

Advantageously, an ASIL D supply system may be constructed with ASIL B components through the described decomposition. There is no need for a second 12-V battery, which is beneficial in terms of installation space, weight and costs. Furthermore, a basic architecture of the first supply path can be used for vehicles with and without autonomous, safety-relevant driving functions, and it can be supplemented modularly with the second supply path and the coupling of the two supply paths for vehicles equipped with autonomous, safety-relevant driving functions.

In addition, the respective disconnecting elements can include at least one MOSFET (Metal-Oxide-Semiconductor Field-Effect Transistor) and a control device for the MOSFET. Advantageously, the MOSFETs involved here are enhancement-mode n-channel MOSFETs; i.e. they are self-locking in the unactuated state and they are conductive when actuated. The control device is connected to the gate of the MOSFET. The MOSFET may also be understood to be a power MOSFET or a DMOSFET (Double-Diffused Metal-Oxide-Semiconductor Field-Effect Transistor). The peculiarity of the DMOSFET, namely that it is unable to block in the reverse direction ($V_{DS}<0$), is countered by the purposeful use of two MOSFETs coupled via a drain in the power path or by two opposing disconnecting elements.

Thus, a disconnecting element can be set up between the first supply path and the second supply path, as a second disconnecting element acting in two directions and is configured as an anti-serial MOSFET switch. The two supply paths are coupled via the power path of the MOSFET switch.

If the first supply path is structured in the classic manner and, for example, the connected loads are protected by fusible cut-outs, a first disconnecting element can be advantageously arranged between the second disconnecting element and the first supply path, in series to the second disconnecting element. The first disconnecting element and the second disconnecting element then allow a fault in the first supply line to be isolated redundantly from the second supply path.

As an optional alternative or in addition to the first disconnecting element arranged between the two supply paths and in series to the second disconnecting element, the first fuse is configured as an electronic fuse as the disconnecting element between the first supply point and the second supply path. This, too, permits disturbance-free isolation. The technical design of the first fuse differs from that of the second fuse. The diversity of the technical design causes the redundancy to be inhomogeneous.

In addition, in an optional form, the first fuse includes at least one MOSFET and at least one actuator that differs from the at least one MOSFET and the at least one actuator of the second fuse. In this way, an inhomogeneous redundancy is easily created.

It is beneficial for the first voltage source to be a first battery and additionally or alternatively a generator with a first nominal voltage. The nominal voltage is typically 12 V, with the corresponding tolerance range in operation. A lead battery or a lithium-ion battery are suitable examples in this case. The term battery here should be understood to be an accumulator such as those commonly used in motor vehicles. In one form, the first battery is used to start up and as a backup battery, and in normal operation the energy is made available by the generator. Of course, in purely electric vehicles the systems are supplied only by the battery. In this case, a DC/DC converter may also be coupled to a high-voltage storage means and can function as a first voltage source.

It is also favorable for the second voltage source to be a second battery with a second nominal voltage that differs from the first nominal voltage. In this case, the second nominal voltage is greater than the first nominal voltage. In one form, the second nominal voltage lies at 48 V or in the high-voltage range, for instance at greater than 400 V, approximately 480 V or greater than 900 V. The second voltage source is electrically coupled to the second connection point through a DC/DC converter, to set a voltage level corresponding to the first nominal voltage.

In another form, the DC/DC converter has at least two partial converters. A first partial converter is coupled to the first supply path and a second partial converter is coupled to the second supply path. Each individual phase of the partial converters here includes a phase switch-off that functions as a disconnecting element. In this way, faults in a supply path can be isolated with no disturbance. To create a redundancy in the sense of the decomposition, the first partial converter can be coupled to the first supply path via a first disconnecting element. Here the first disconnecting element, like the first partial converter, meets a safety level that corresponds to ASIL B.

In addition, a backup battery can be provided in the second supply path. The backup battery advantageously has a nominal voltage that corresponds to the first nominal voltage in a tolerance range. The backup battery may be a lithium-titanate battery.

A plurality of disconnecting elements can be advantageously arranged in an assembly with a common housing. An assembly of this kind, for example, can include a second connection point, a coupling point to the first supply path and a plurality of second supply points. In an alternative form, a plurality of second fuses are combined into one assembly. Such assemblies have the advantage that the installation is simplified. Thus, in the case of a large number of parallel, equivalent disconnecting elements to protect a plurality of safety-relevant loads, a control device may be configured to actuate a plurality of MOSFETs of the disconnecting elements arranged in parallel. As a result, the number of control devices can be reduced. In special cases, release can be even quicker, since more information on the total system is available.

The above-described properties, features and advantages of the present disclosure, as well as the manner in which they are achieved, will become clearer and more easily understood in the following schematic description of one form, and they are explained below in greater detail with reference to the drawings. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
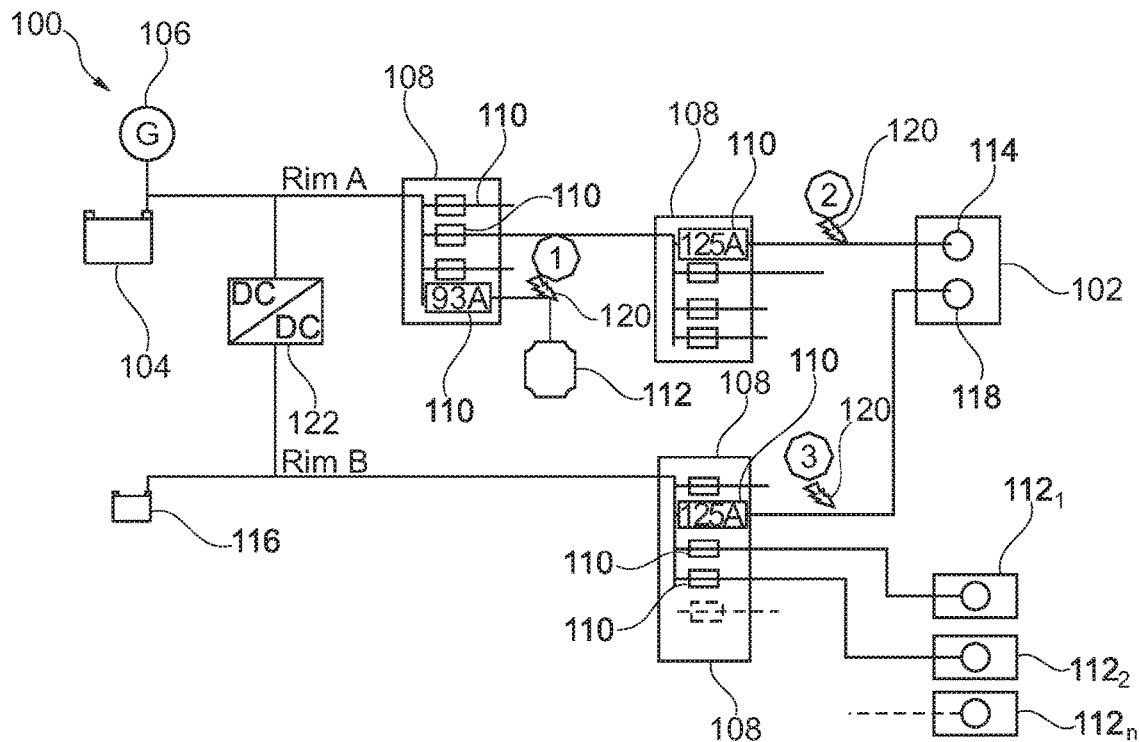
FIG. 1 shows a schematic drawing of a power supply system for one or more safety-relevant loads according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic drawing of a power supply system 100 for one or more safety-relevant loads 102 according to the prior art. A starter battery 104 and a generator 106 are arranged in parallel to feed a first supply path Rim A. An auxiliary heater is electrically connected as a load 112, via a first current distributor 108 having a plurality of fusible cut-outs 110. The first current distributor 108 is coupled to a second current distributor 108, which is coupled to the safety-relevant load 102 through a first supply point 114. A second supply path Rim B is arranged adjacent thereto and is fed by a backup battery 116. A second supply point 118 is coupled through a current distributor 108 and a fusible cut-out 110 of the current distributor 108, and the safety-relevant load 102 is coupled through the second supply point as the redundant supply. The first supply path Rim A and the second supply path Rim B are coupled via a DC/DC converter 122.

For illustration purposes, three faults 120 are shown as octagons with an associated jagged arrow and with a digit inside the form. A short circuit cannot be isolated without disturbances, as will be explained in greater detail below.

In other words, FIG. 1 shows an example of the concept of a dual supply structure as implemented in accordance with a conventional layout. The function 102 (functional safety) according to ASIL D (such as steering), which is important to availability, is internally structured in two channels with two actuators (not shown), to be able to offer the required ASIL safety level. Corresponding to the internal, dual-channel structure, two supply terminals (114, 118) are provided for the external supply. For a redundant supply, they are to be fed from two independent sources. This arrangement has two disadvantages:

First, the independence of the two supply paths Rim A, Rim B is essential for the redundant supply. The DC/DC converter 122 between the two paths thus has to be configured in accordance with ASIL D, which entails considerably effort and expense.

Second, protection against overload is provided in both supply paths Rim A, Rim B solely with fusible cut-outs 110. These fuses have the systemic limitation that they can only disconnect a load very sluggishly. The current required to blow the fuse is so high that so much voltage drops across the impedances of the on-board electrical system (internal resistance of battery, resistance of fuses, cables and chassis ground feedback) that the other consumers 102, 112 in the on-board electrical system move into overvoltage reset.

As a result, a short circuit 120 (1) in the auxiliary heater 112 causes a voltage dip on the upper supply line Rim A. The functional safety function 102 (steering) can then feed itself with stabilized voltage via the lower supply terminal 118, provided that the DC/DC converter 122 reliably disconnects the second supply path Rim B. The technical safety requirement of "stable-voltage supply" with ASIL D is thus transferred 1 to 1 onto the necessary performance of the converter.

A short circuit 120 at point 3 is important. Due to the sluggishness of the fuse 110, the small backup battery 116 and the DC/DC converter 122 are unable to hold the voltage. All sensors 1 to n $112_1$, $112_2$, $112_n$ fail simultaneously, leading to blindness of the autonomous driving function.

An issue with the two inputs 114, 118 of the safety-relevant load 102 (functional safety function) may also lead to a complete failure of both supply paths Rim A and Rim B. For example, the failure of the brake would simultaneously cause failure of the steering. Here it becomes clear that the layout of the supply lines A and B lacks diversity.

Figure 2:
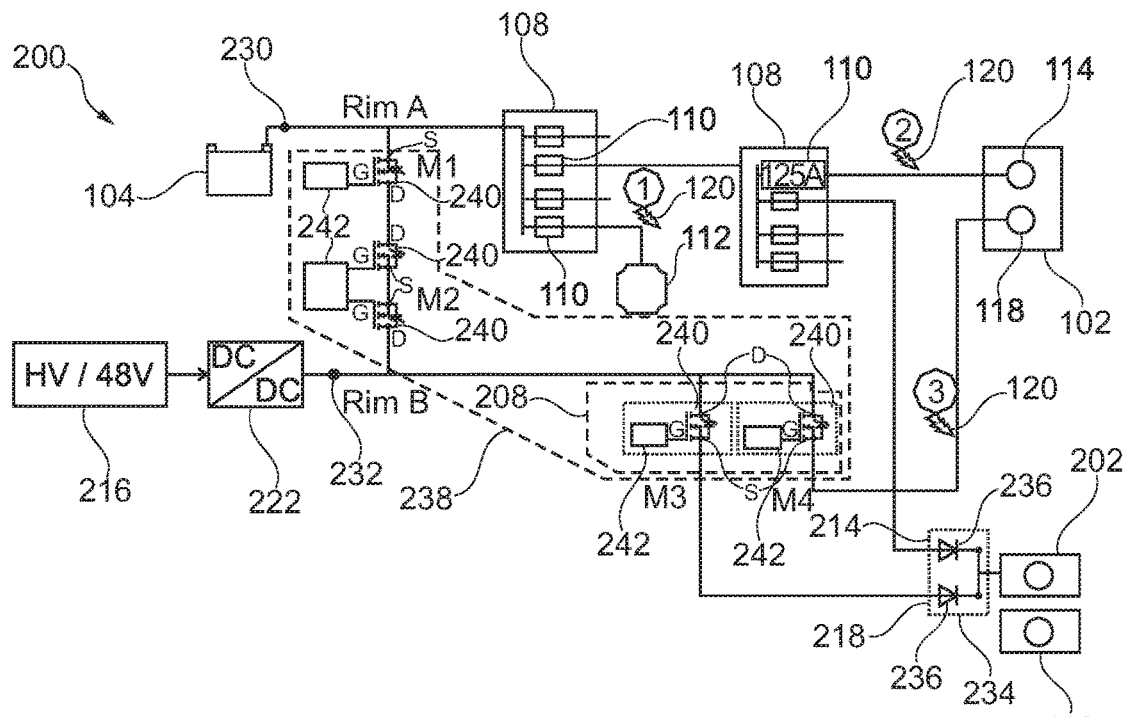
FIG. 2 shows a schematic drawing of a power supply system for one or more safety-relevant loads, with two supply paths coupled through a bidirectional and a unidirectional fuse according to the teachings of the present disclosure.

FIG. 2 shows a schematic drawing of a power supply system 200 for one or more safety-relevant loads 102, comprising two supply paths Rim A, Rim B coupled via a bidirectional fuse M2 and a unidirectional fuse M1, in a first form of the present disclosure. The fuses M1, M2 are also referred to as disconnecting elements M1, M2. The first supply path Rim A largely corresponds to the form shown in FIG. 1.

The first supply path Rim A is coupled through a first connection point 230 to a first voltage source 104. The second supply path Rim B is fed via a DC/DC converter 222 and the second connection point 232. A current distributor 208 in the second supply path Rim B has electronic fuses M3, M4 as disconnecting elements M3, M4. One electronic fuse M4 is coupled to the second supply point 118 to feed the safety-relevant load 102. A second safety-relevant load 202 is connected via a coupling element 234. The coupling element 234 has an additional first supply point 214 that is electrically connected to a fusible cut-out 110 of a current distributor 108 of the first supply path Rim A, and an additional second supply point 218 that is electrically connected to the electronic fuse M3 of the second supply path Rim B. An outlet of the coupling element 234 is electrically connected to the safety-relevant load 202. The two additional supply points 214, 218 are electrically connected via diodes 236 to the output of the coupling element 234. A safety-relevant load 202 can be fed via the coupling element 234, which has only one supply terminal in this form.

The upper supply path (Rim A) is a conventional feed branch with fusible cut-outs 110. It can be part of the conventional on-board electrical system that is also used in vehicles without an autonomous driving function. The lower supply path Rim B is the part of the on-board electrical system that has been added to power the functional safety functions 102, 202. It uses an electronic safeguard 208 to avoid a disturbance in the form of a voltage dip upon overload on the Rim B and A.

A short circuit 120 in the normal on-board electrical system function of auxiliary heater 112 causes a voltage drop on the upper supply path Rim A. It is isolated from the lower supply path Rim B via two independent ASIL B instances. First of all, M1 closes, then M2, which as an anti-serial MOSFET switch can close in both directions.

A short circuit 120 labeled 3 on the lower supply, i.e., via the second supply path Rim B and the second supply point 118, is isolated disturbance-free by the disconnecting element M4. There is another, additional fallback level that exists to provide that the disconnecting element M4 is not the only instance to be given the safety level ASIL D. This additional level constitutes isolation by disconnecting element M2 in the event that disconnecting element M4 fails and cannot disconnect. Thus, the upper supply path Rim A is isolated from the short circuit 120 designated as 3 by disconnecting element M4 and as needed by disconnecting element M2. The important thing is that a specific electronic safeguard M3, M4 is provided in the lower/second supply path Rim B for each functional safety-relevant load 102, 202.

The disconnecting elements M1, M2 and M3, M4 are independent, but they are also advantageously integrated into a module 238. A complete failure of the upper functional safety function 102 with short circuits at (2.) and (3.) does not result in complete failure of the supply, since the second supply path Rim B is isolated via the disconnecting element M4 and therefore the second supply path Rim B can supply the other functional safety functions 202. Therefore, diversity in the supply is given.

As already indicated above, the safety-relevant load 102 is fed via the first supply point 114, which is coupled to the first supply path Rim A with starter battery 104, i.e. a first power source 104; and it is fed via the second supply point 118, which is coupled to the second supply path Rim B with high-voltage battery or 48-V battery 216, i.e. a second power source 216. Both the two power sources 104, 216 and the supply paths Rim A, Rim B connected to them are independent of one another. The first supply path Rim A and the first supply point 114 coupled to it are protected by fusible cut-outs 110. The second supply path Rim B and the second supply point 118 coupled to it are protected by unidirectional electronic fuses M3, M4. Here the inhomogeneity in the redundancy of the protection becomes clear at first glance, implemented here by a classic fuse 110 as opposed to a semiconductor fuse M3, M4 or MOSFET 240.

To achieve a comparable inhomogeneity of the redundancy in the form described below and illustrated in FIG. 3, the electronic fuses M5, M6 should be designed differently from the electronic fuses M3, M4. This refers to the selection of the electronic components used within the electronic fuses M3, M4, M5, M6, and to the design tool used during development.

The disconnecting elements M1 and M2 can advantageously be controlled via the battery voltage. A short circuit 120 on the upper/first supply path Rim A, i.e., for example, the short circuits 120 designated as 1 or 2, leads to a voltage dip in the battery 104. A short circuit 120 on the lower/second supply path Rim B, i.e., for example, a short circuit 120 designated as 3, also leads to a voltage drop in the battery 104, if it has not been disconnected via the disconnecting elements M3 or M4. Thus, opening the disconnecting elements M1 and M2 when the battery voltage drops to below 11 V, for example, results in the isolation of a voltage drop, either on the first supply path Rim A or the second supply path Rim B.

Optionally, as shown in FIG. 1, for instance in vehicles with internal combustion engines, a generator may be provided, which is arranged parallel to the starter battery 104 and which, on the one hand, supplies the first supply path Rim A with power and, on the other hand, charges the starter battery 104. An optional charging device (not shown here either) fed via an external voltage source is provided here for electric vehicles or plug-in hybrid vehicles.

The disconnecting elements M1, M2, M3, M4 each include a MOSFET 240 and a control device 242. The control device 242 is connected to gate G, also referred to as gate terminal G, of the MOSFET 240. The MOSFET 240 is a self-locking n-channel MOSFET 240.

The disconnecting element M2 includes at least two MOSFETs 240, which is configured as an anti-serial MOSFET switch due to their arrangement. A second disconnecting element M2 acting in two directions is the result. For this purpose, the two sources S of the two MOSFETs 240 of the second disconnecting element M2 are directly electrically interconnected.

The power path of the MOSFET switch 240 of the two disconnecting elements M1, M2 lies between the two supply paths Rim A, Rim B. Thus, source S of the MOSFET 240 of the first disconnecting element M1 is coupled to the first supply path Rim A, drain D of the same MOSFET 240 is electrically connected to drain D of one of the MOSFETs 240 of the second disconnecting element M2. Drain D of the second MOSFET 240 of the second disconnecting element M2 is coupled to the second supply path Rim B.

The MOSFETs 240 of the electric fuses M3, M4 are arranged in such a manner that source S points toward the load(s) 102, 112, 202 and drain D points toward the voltage supply accordingly, i.e. in this case high-voltage or 48-V battery 216.

In the remaining Figures, to facilitate legibility, the reference numbers 240, 242 will be omitted.

Figure 3:
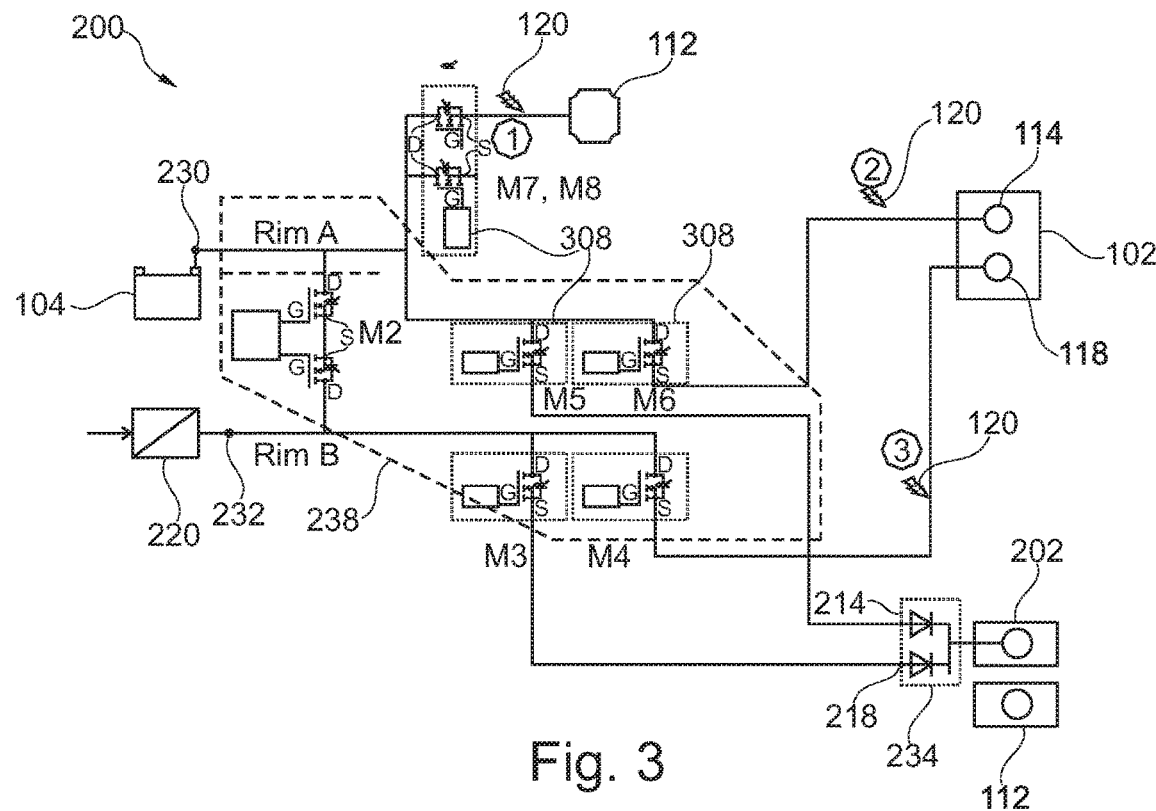
FIG. 3 shows a schematic drawing of a power supply system with two supply paths coupled through a bidirectional fuse, in which one or more safety-relevant load(s) is/are coupled via an electronic fuse.

FIG. 3 shows a schematic drawing of a power supply system 200 with two supply paths Rim A, Rim B coupled via a bidirectional fuse M2, in which the one or more safety-relevant loads 102, 202 is/are each coupled on via an electronic fuse M3, M4 in accordance with one form of the present disclosure. The form shown in FIG. 3 corresponds to the form shown in FIG. 2, with the difference that the current distributor 108 with fusible cut-outs 110 as shown in FIG. 2 has been replaced with current distributor 108 with electronic fuses M5, M6, M7, M8. Thus, the unidirectional electronic fuse M1 can be omitted, since the electronic fuses M5, M6, M7, M8 can assume the task of a disconnecting element M5, M6, M7, M8. The electronic fuses M5, M6, M7, M8 are unidirectional.

One special feature of the two electronic fuses M7, M8, both of which have a MOSFET, is that one control unit is configured to actuate both MOSFETs. Thus, one control unit is connected to GATE of both MOSFETs.

The two supply paths Rim A and Rim B shown in the form represented in FIG. 3 have an inhomogeneous redundancy. The electronic fuses M5, M6 in the first supply path Rim A differ from the electronic fuses M3, M4 in the second supply path Rim B. Thus, MOSFETs and actuators that are not equivalent are used on both supply paths Rim A and Rim B for the electronic fuses in order to achieve the desired decomposition of an ASIL D classification.

In other words, FIG. 3 shows a variant that works exclusively with electronic protection M1, M2, M3, M4, M5, M6, M7, M8. A short circuit 120 and the accompanying voltage drop is isolated (first instance in ASIL B) in each case by the electronic fuse M3, M4, M5, M6, M7, M8 specific to the particular path. As a second instance (ASIL B) the switch M2 can disconnect the respective other supply path Rim A, Rim B to inhibit spreading of the voltage drop.

Figure 4:
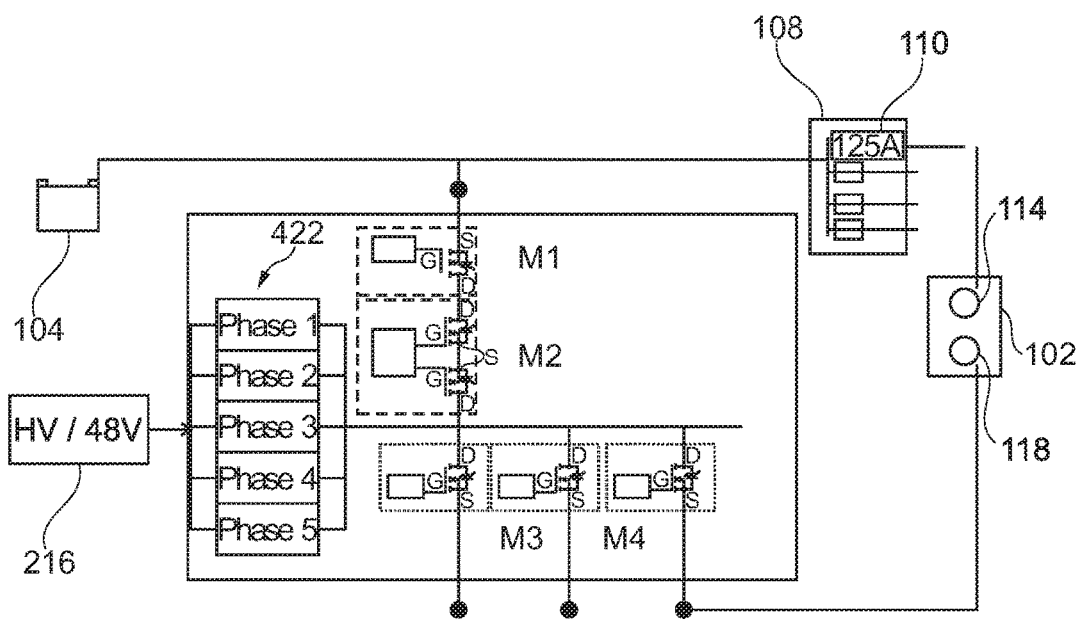
FIG. 4 shows a schematic drawing of a power supply system according to the form in FIG. 2, with a five-phase DC/DC converter.

FIG. 4 shows a schematic diagram of a power supply system 200 according to the form shown in FIG. 2, with a five-phase DC/DC converter 422 according to another form of the present disclosure. The drawing is a slightly reduced version of the drawing of the form from FIG. 2, with the DC/DC converter 422 being configured as a five-phase DC/DC converter.

In other words, FIG. 4 shows an integrated DC/DC converter 422 that includes the intelligent protection and switching functions according to FIG. 2. Thus, as a singular unit the converter is a suitable addition to a conventional on-board electrical system to enhance the on-board power supply network for availability-relevant functional safety functions 102. The adequate independence of the modules shown is provided in the structural concept.

Figure 5:
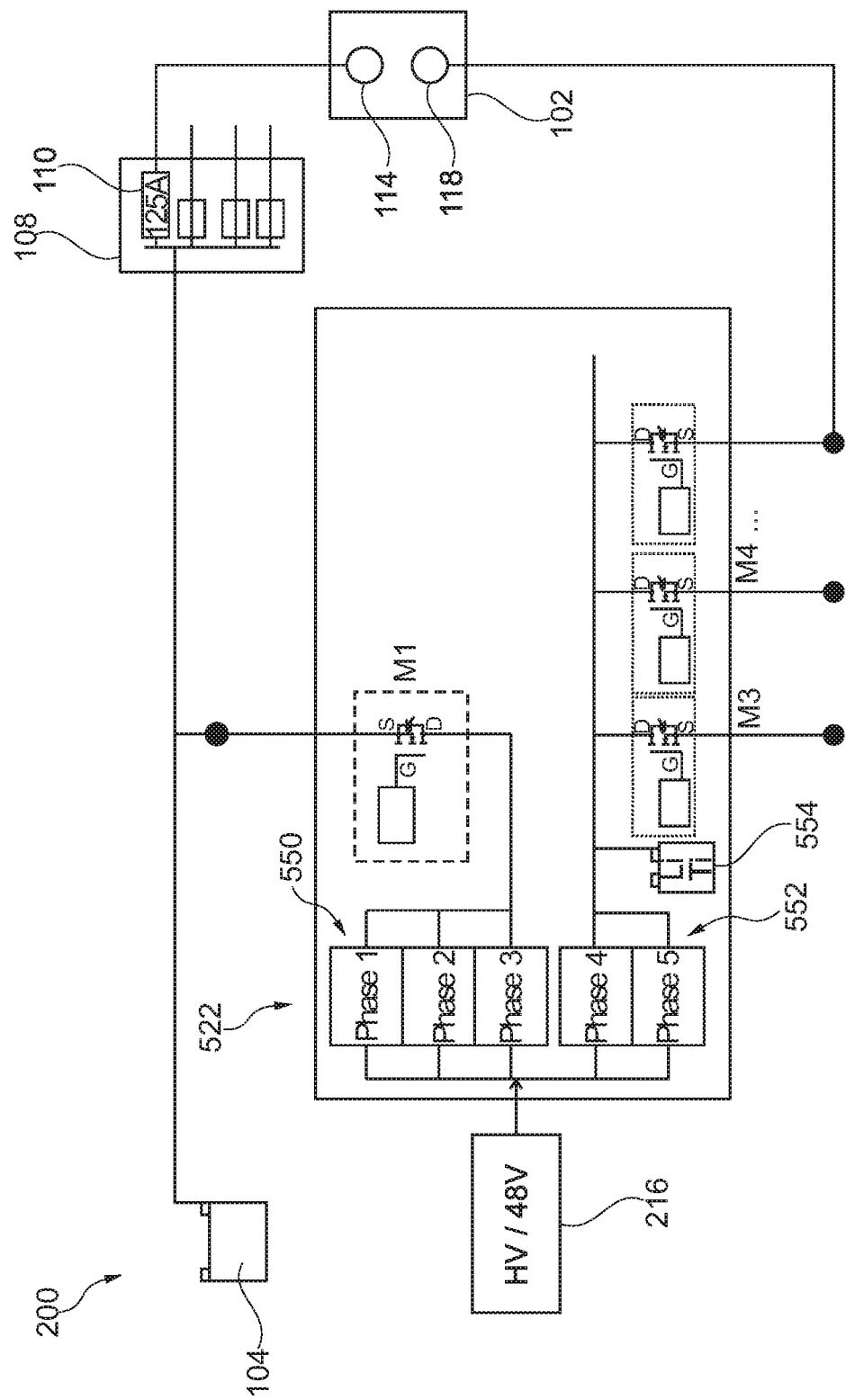
FIG. 5 shows a schematic drawing of a power supply system for one or more safety-relevant loads, with a DC/DC converter divided up into partial converters.

FIG. 5 shows a schematic drawing of a power supply system 200 for one or more safety-relevant loads 102, with a DC/DC converter 522 subdivided into partial converters 550, 552, in accordance with another form of the present disclosure. FIG. 5 shows an integrated DC/DC converter 522 subdivided into two partial converters 550, 552 to supply both paths Rim A, Rim B. Since only a portion of the converter capacity here (phase 4 and phase 5) is available for supplying the redundant path Rim B, a backup battery 554 (here a lithium-titanate battery 554) may be kept available, depending on the maximum power request. In this arrangement, there are again two disconnecting elements each M1, M3, M4, 550, 552, that are capable of interrupting a fault on a supply path Rim A, Rim B, these being for the upper/first supply path Rim A the electronic fuse M1 and the phases (switch-off) 1 to 3 of the first partial converter 550, and for the lower/second supply path Rim B the particular electronic fuses M3, M4, and the phase switch-off for phases 4 and 5 of the second partial converter 552.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A power supply system for safety-relevant systems in a motor vehicle comprising:
   a first supply path having a first connection point coupled to a first voltage source, at least one first supply point operable to be coupled to a safety-relevant load, and a first fuse between the first connection point and the first supply point; and
   a second supply path electrically coupled to the first supply path, the second supply path having a second connection point coupled to a second voltage source, at least one second supply point operable to be coupled to the safety-relevant load, and an electronic second fuse between the second connection point and the second supply point,
   wherein at least one of the first fuse and the second fuse is a disconnecting element operable to isolate a fault and arranged between the first supply point and the second supply path and between the second supply point and the first supply path.

2. The power supply system according to claim 1, wherein the at least one disconnecting element includes at least one MOSFET and a control device.

3. The power supply system according to claim 2, wherein the at least one MOSFET is a self-locking n-channel MOSFET.

4. The power supply system according to claim 2, wherein the MOSFET is a DMOSFET.

5. The power supply system according to claim 1 further comprising a second disconnecting element configured to act in two directions and arranged between the first supply path and the second supply path.

6. The power supply system according to claim 5, wherein the second disconnecting element is an anti-serial MOSFET switch.

7. The power supply system according to claim 1, wherein a first disconnecting element is arranged between a second disconnecting element and the first supply path and in series to the second disconnecting element.

8. The power supply system according to claim 1, wherein the first fuse is an electronic fuse and is the disconnecting element is arranged between the first supply point and the second supply path.

9. The power supply system according to claim 8, wherein the first electronic fuse is configured differently than the electronic second fuse.

10. The power supply system according to claim 1, wherein the first voltage source is at least one of a first battery and a generator with a first nominal voltage.

11. The power supply system according to claim 10, wherein the second voltage source is a second battery with a second nominal voltage different from the first nominal voltage, wherein the second voltage source is electrically coupled to the second connection point via a DC/DC converter.

12. The power supply system according to claim 11, wherein the DC/DC converter includes at least a first and a second partial converter, wherein the first partial converter is coupled to the first supply path and the second partial converter is coupled to the second supply path, wherein a phase switch-off of the first and second partial converters represents a particular disconnecting element.

13. The power supply system according to claim 12, wherein the first partial converter is coupled to the first supply path via a first disconnecting element.

14. The power supply system according to claim 1, wherein the second supply path is coupled to a backup battery having the first nominal voltage.

15. The power supply system according to claim 14, wherein the backup battery is a lithium-titanate battery.

16. The power supply system according to claim 1 further comprising a plurality of disconnecting elements.

17. The power supply system according to claim 1 further comprising a plurality of equivalent disconnecting elements arranged in parallel and operable to protect a plurality of safety-relevant loads, and a control device configured to actuate a plurality of MOSFETs of the parallel-arranged disconnecting elements.

18. The power supply system according to claim 1 further comprising a plurality of first supply points and a plurality of second supply points.

19. The power supply system according to claim 1, wherein the fault is isolated in conformity with ASIL B.

20. A motor vehicle including the power supply system according to claim 1.

* * * * *